US010722894B2

(12) United States Patent
Van Gemert

(10) Patent No.: US 10,722,894 B2
(45) Date of Patent: Jul. 28, 2020

(54) TOOTH BLOCK FOR A DEMOLITION TOOL

(71) Applicant: Caterpillar Work Tools B.V., s-Hertogenbosch (NL)

(72) Inventor: Johannes Lambert Leonardus Van Gemert, Mill (NL)

(73) Assignee: Caterpillar Work Tools B.V., s-Hertogenbosch (NL)

(*) Notice: Subject to any disclaimer, the term of this patent is extended or adjusted under 35 U.S.C. 154(b) by 446 days.

(21) Appl. No.: 15/550,869

(22) PCT Filed: Feb. 8, 2016

(86) PCT No.: PCT/EP2016/052605
§ 371 (c)(1),
(2) Date: Aug. 14, 2017

(87) PCT Pub. No.: WO2016/128345
PCT Pub. Date: Aug. 18, 2016

(65) Prior Publication Data
US 2018/0043366 A1 Feb. 15, 2018

(30) Foreign Application Priority Data
Feb. 13, 2015 (EP) .................................... 15155108

(51) Int. Cl.
*B02C 1/10* (2006.01)
*B23D 17/00* (2006.01)
*B23D 35/00* (2006.01)
*E04G 23/08* (2006.01)
*E02F 9/28* (2006.01)
*E02F 3/96* (2006.01)

(52) U.S. Cl.
CPC ................. *B02C 1/10* (2013.01); *B23D 17/00* (2013.01); *B23D 35/001* (2013.01); *E02F 3/965* (2013.01); *E02F 9/2883* (2013.01); *E04G 23/082* (2013.01); *B02C 2210/02* (2013.01)

(58) Field of Classification Search
CPC .......... B02C 1/10; E02F 9/2883; E02F 3/965; E04G 23/082; B23D 17/00; B23D 35/001
USPC ..................... 241/266, 264; 30/134
See application file for complete search history.

(56) References Cited

U.S. PATENT DOCUMENTS 6,394,375 B1 * 5/2002 Balvanz .............. B02C 13/2804
241/197
9,222,243 B2 * 12/2015 Cheyne ................... E02F 9/267
(Continued)

FOREIGN PATENT DOCUMENTS

CN       1849428 B     4/2012
DE   202009002635 U1   4/2010
(Continued)

Primary Examiner — Faye Francis

(57) ABSTRACT

A tooth shroud for a demolition tool is disclosed wherein forces produced during demolition operations may be dissipated so as to avoid excessive forces at stress points. A tooth block for a demolition tool comprises a first tooth shroud and a second tooth shroud. The first and second tooth shroud each comprising a body having a front wall and an end wall wherein a cavity is enclosed by the front wall and the end wall; an impact member extending longitudinally from the body; and a cut-out disposed on the end wall, wherein the first tooth shroud is connected to the second tooth shroud.

10 Claims, 9 Drawing Sheets

(56) References Cited

U.S. PATENT DOCUMENTS

| | | | | |
|---|---|---|---|---|
| 2006/0010726 A1* | 1/2006 | Emrich | ............... | E02F 9/2833 37/456 |
| 2007/0245568 A1* | 10/2007 | Schipp | ............... | B23D 31/008 30/134 |
| 2011/0225829 A1* | 9/2011 | Raihala | ............... | B23D 31/008 30/134 |
| 2011/0297773 A1 | 12/2011 | Nye et al. | | |
| 2014/0231567 A1* | 8/2014 | Van Gei | ............... | E02F 3/965 241/300 |
| 2015/0368884 A1* | 12/2015 | Cheyne | ............... | E02F 9/2833 37/453 |
| 2016/0002893 A1* | 1/2016 | Haslett | ............... | E02F 9/2825 37/453 |
| 2016/0348339 A1* | 12/2016 | Christenson | ............ | E02F 3/965 |

FOREIGN PATENT DOCUMENTS

| | | | |
|---|---|---|---|
| EP | 2581506 A1 | 4/2013 | |
| JP | 2004202477 A | 7/2004 | |
| WO | 2013/067585 A1 | 5/2013 | |

\* cited by examiner

US 10,722,894 B2
1
TOOTH BLOCK FOR A DEMOLITION TOOL

CROSS-REFERENCE TO RELATED APPLICATIONS

This application is a national phase application of International Patent Application No. PCT/EP2016/052605 filed Feb. 8, 2016, which claims priority to European Patent Application No. 15155108.2 filed Feb. 13, 2015, both of which are incorporated by reference herein in their entireties for all purposes.

TECHNICAL FIELD

This disclosure relates to the field of demolition tools for crushing and/or cutting material and more particularly to the field of tooth blocks for demolition tools.

BACKGROUND

A demolition tool for crushing and/or cutting material is generally known. Typically, the demolition tool may comprise a jaw set having a lower jaw and an upper jaw. The upper and lower jaws may be pivotally connected. The upper and lower jaws may be moveable relative to each other. Blades may be provided on both the upper jaw and the lower jaw. The work material may be crushed or cut by closing the jaws under hydraulic pressure. The demolition tool may comprise a frame that connects the jaw set to a jib of a machine.

The demolition tool may have a jaw set that is suitable for crushing concrete. The jaw set may be adapted for crushing or cutting other materials, for example for cutting scrap iron and/or iron sections. The abrasive nature or hardness of some of these materials may cause the relatively rapid wear of the surfaces that engage the materials.

The demolition tool may be provided with replaceable wear parts that have wear surfaces. A type of replaceable wear part may be a wear pack. The wear pack may be connected directly to the jaw set by conventional techniques. The wear pack may be provided on the upper and/or the lower jaw. The wear pack may be retained by fasteners that are exposed to relatively high stresses during operation.

WO2013053886 discloses a wear pack for shielding a front end of a jaw set of a demolition tool. The wear pack may have a positioning portion provided on a bracket member for the alignment prior to mounting. The wear pack may have a force transfer portion provided on the bracket member for the transfer of demolition forces to the front end of the jaw. The positioning portion may be contiguous with the force transfer portion.

The present disclosure is directed, at least in part, to improving or overcoming one or more aspects of the prior art system.

BRIEF SUMMARY OF THE INVENTION

The present disclosure describes a tooth block for a demolition tool. The tooth block may comprise a first tooth shroud and a second tooth shroud. The first and second tooth shrouds may each comprising a body having a front wall and an end wall wherein a cavity is enclosed by the front wall and the end wall; an impact member extending longitudinally from the body; and a cut-out disposed on the end wall, wherein the first tooth shroud is connected to the second tooth shroud.

BRIEF DESCRIPTION OF THE DRAWINGS

The foregoing and other features and advantages of the present disclosure will be more fully understood from the following description of various embodiments, when read together with the accompanying drawings, in which.

DETAILED DESCRIPTION

This disclosure generally relates to a tooth block for a demolition tool. The tooth block may be disposed on a part of the demolition tool. The demolition tool may be adapted to receive the tooth block. The tooth block may be composed of a material or a composite of materials that are resistant to wear due to operation of the demolition tool. In an embodiment, the tooth block may be composed of high strength steel.

Figure 1:
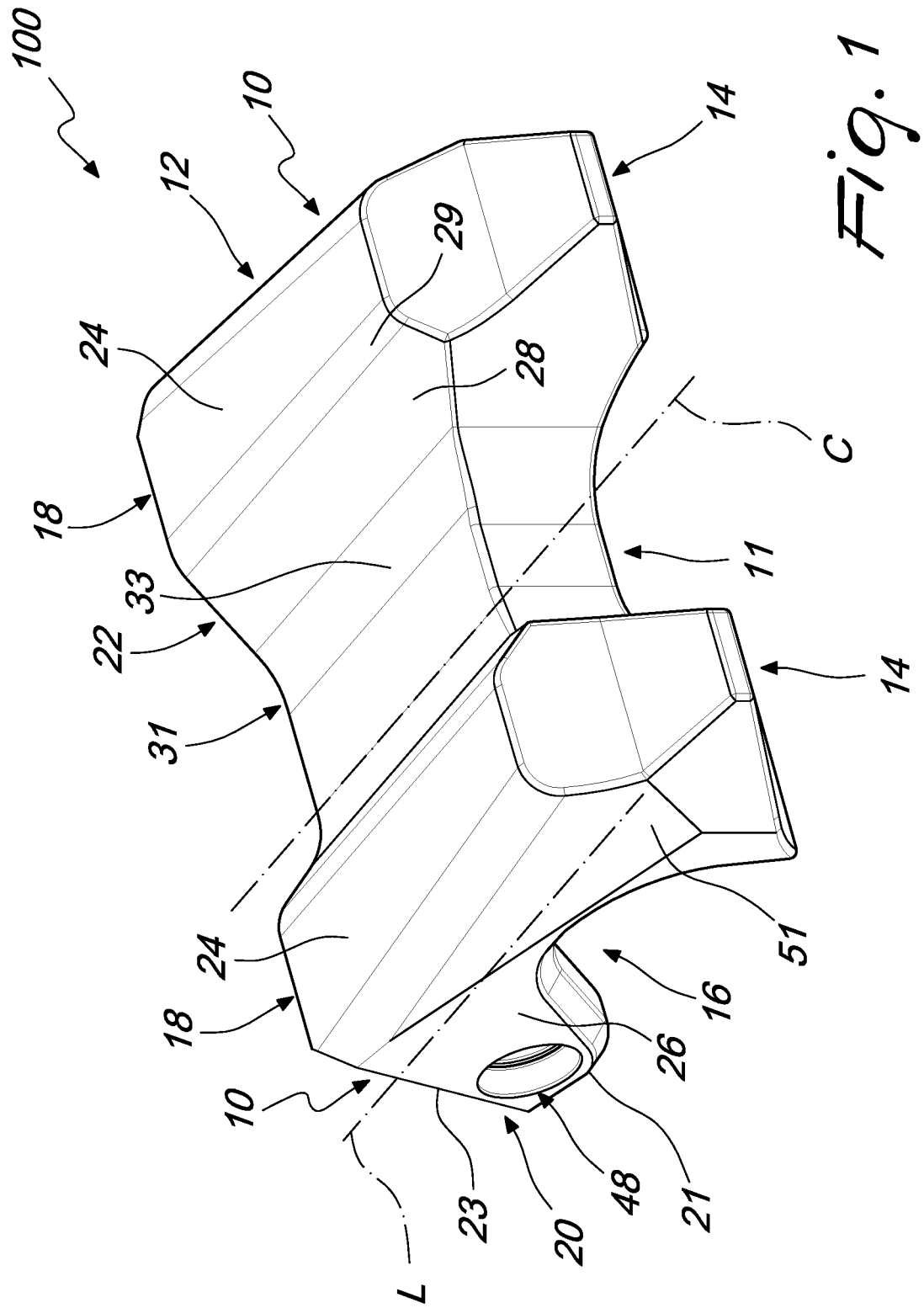
FIG. 1 is a front isometric view of a tooth block having a first tooth shroud and a second tooth shroud according to the present disclosure.

FIG. 1 illustrates a tooth block 100. The tooth block 100 may have a first tooth shroud 10 and a second tooth shroud 10. Tooth block 100 may be formed as a monolithic structure. A central member 11 may connect the first and second tooth shrouds 10. the tooth block 100 may be symmetrical about a central axis 15. First and second tooth shrouds 10 may be mirrored about the central axis 15. First tooth shroud 10 may be specular to the second tooth shroud 10 about the central axis 15.

The first and second tooth shrouds 10 will be hereinafter described together. With reference to FIG. 1, the tooth shroud 10 may comprise a body 12, an impact member 14 and a cut-out 16. The impact member 14 may be connected to the body 12. The cut-out 16 may be formed on the body 12.

The body 12 may be elongated. In an embodiment, body 12 may have a substantially rectangular shape. Body 12 may have a longitudinal axis L. Body 12 may comprise a front wall 18 and an end wall 20. The end wall 20 may be inclined relative to the front wall 18. In an embodiment, the end wall 20 may be substantially normal to the front wall 18.

End wall 20 may be joined to the front wall 18 along an edge. End wall 20 may have a free side edge 21 opposite the edge joined to the front wall 18. End wall 20 may have a base edge 23. Base edge 23 may extend between the side edge 21 and the edge joined to the front wall 18. Base edge 23 may be at the opposite end from the end wall 20 relative to the impact member 14. Side edge 21 may extend from the base edge 23 to the impact member 14. Base edge 23 may have a length of 127 mm to 132 mm. Base edge 23 may have a length of 129.5 mm.

Body 12 may be joined to the central member 11. The central member 11 may be joined to the body 12 through a sidewall 22. Sidewall 22 may be contiguous with the front wall 18. Front wall 18 may be interposed between the end wall 20 and the sidewall 22. Sidewall 22 may be inclined relative to the front wall 18. Sidewall 22 may be inclined relative to the end wall 20.

The central member 11 may further comprise an intermediate wall 31. Sidewall 22 may be contiguous with an intermediate wall 31. Sidewall 22 may be interposed between the front wall 18 and the intermediate wall 31. The intermediate wall 31 may be parallel to the front wall 18. Intermediate wall 31 may be orthogonal to the end wall 20. Intermediate wall 31 may be inclined relative to the sidewall 22.

Central member 11 may connect first and second front walls 18 of the respective first and second tooth shrouds 10. The central member 11 may comprise first and second sidewalls 22 and first and second intermediate walls 31 at opposite ends. The intermediate walls 31 may be joined to form the central member 11. The respective first and second intermediate walls 31 may be mutually contiguous. The respective intermediate contact surfaces 33 may be co-planar. The respective intermediate contact surfaces 33 may be recessed from the respective front contact surfaces 24.

Front wall 18 may have a front contact surface 24. Front contact surface 24 may be substantially planar. End wall 20 may have an end contact surface 26. End contact surface 26 may be substantially planar. Front contact surface 24 and end contact surface 26 may form a continuous demolition surface that contacts the object to be demolished. In an embodiment, sidewall 22 may have a side contact surface 28. The demolition surface may comprise the side contact surface 28.

The front contact surface 24 may be inclined relative to the end contact surface 26. Front contact surface 24 may be connected to the end contact surface 26 by a first intermediate contact surface 27. First intermediate contact surface 27 may be curved. First intermediate contact surface 27 may be curved between the front contact surface 24 and the end contact surface 26. In an embodiment, the front contact surface 24 may be substantially normal to the end contact surface 26.

In an embodiment, the front contact surface 24 may be inclined relative to the side contact surface 28. Front contact surface 24 may be connected to the side contact surface 28 by a second intermediate contact surface 29. Second intermediate contact surface 29 may be curved. Second intermediate contact surface 29 may be curved between the front contact surface 24 and the side contact surface 28. In an embodiment, front contact surface 24 may be inclined relative to the second contact surface 28. The demolition surface may further comprise the first intermediate contact surface 27 and the second intermediate contact surface 29.

In a further embodiment, intermediate wall 31 may have an intermediate contact surface 33. The intermediate contact surface 33 may be contiguous with the side contact surface 28. Intermediate contact surface 33 may be spaced from the front contact surface 24. Intermediate contact surface 33 may be substantially parallel to the front contact surface 24. The demolition surface may further comprise the intermediate contact surface 33.

The body 12 may further comprise a coupling portion 48 provided in the end wall 20. The coupling portion 48 may be configured to enable the tooth shroud 10 to be coupled to the demolition tool. Coupling portion 48 may be disposed remote from the impact member 14. Coupling portion 48 may be spaced from the front wall 18. Coupling portion 48 may be disposed adjacent the side edge 21. Coupling portion 48 may be disposed adjacent the base edge 23.

End contact surface 26 may comprise a facet 51. Facet 51 may be inclined relative to the remainder of the end contact surface 26. The surface of facet 51 may be inclined relative to the surface of coupling portion 48. Facet 51 may extend longitudinally across the end contact surface 26.

Facet 51 may be substantially triangular shaped. The base of the triangular shaped facet 51 may be adjacent the impact member 14. A sole vertex opposite the base may be furthest vertex from the impact member 14 and disposed towards the base edge 23. An edge of the vertex may be contiguous with the first intermediate contact surface 27. Facet 51 may have a base vertex cut off at the impact member 14.

Figure 2:
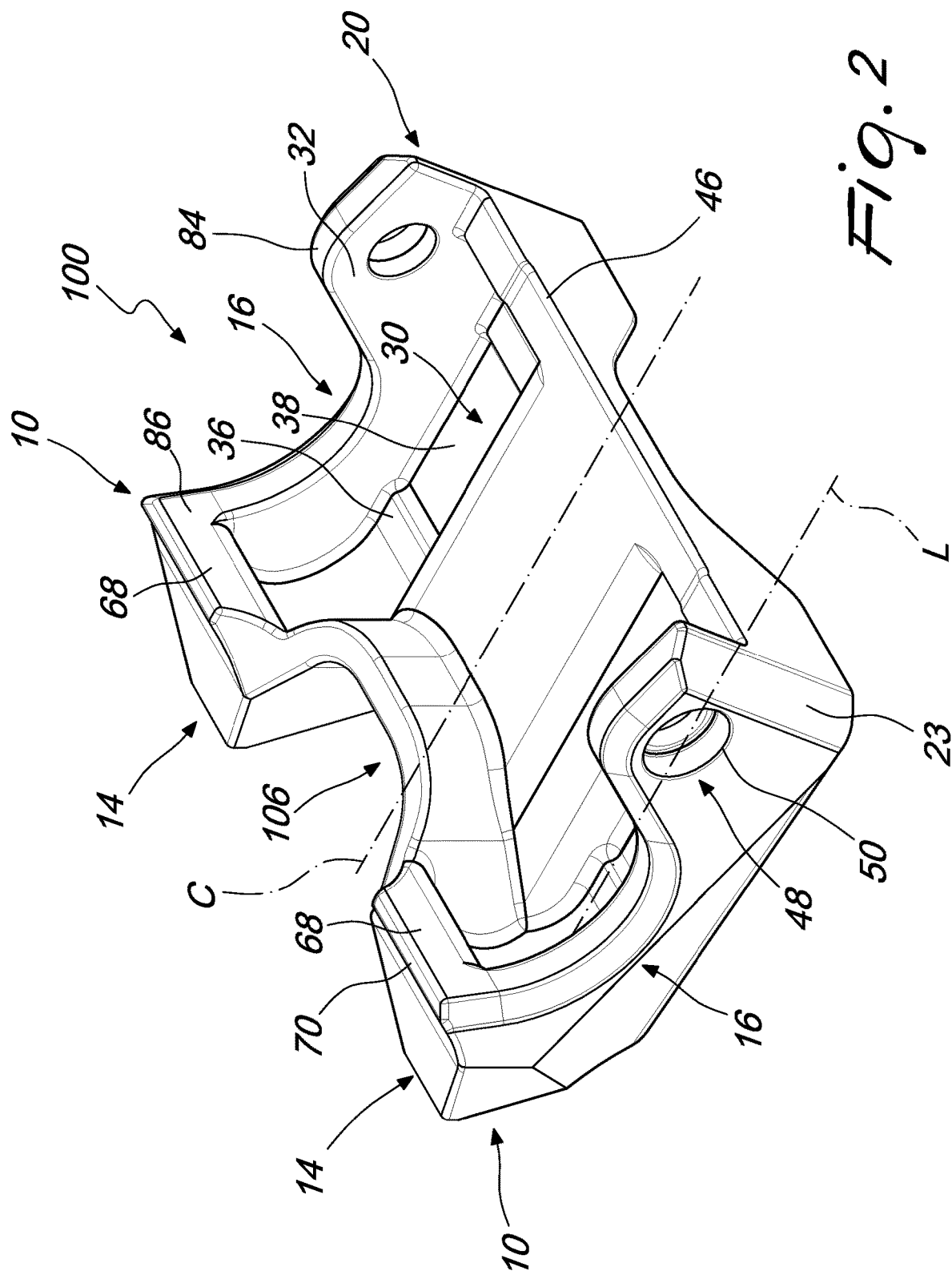
FIG. 2 is a rear isometric view of a tooth block according to the present disclosure.

With reference to FIG. 2, Coupling portion 48 may comprise a hole 50 to permit passage of a pin or a bolt to couple with a corresponding portion in the demolition tool. Hole 50 may be a through hole and extend through the end wall 20. Hole 50 may extend between the end contact surface 26 and the end inner surface 32. Hole 50 may have a central axis normal to the longitudinal axis L.

At the end contact surface 26, hole 50 may have a diameter of 35 mm to 45 mm. Hole 50 may have a diameter of 40 mm. Hole 50 may have a reduced diameter at the end inner surface 32. Lumen of hole 50 have may have a reduced diameter from partway therethrough to the end inner surface 32. Hole 50 may have a diameter of 30 mm to 40 mm. Hole 50 may have a radius of 35 mm.

Front wall 18 may have a front inner surface 30. Front inner surface 30 may contact the respective surface on the demolition tool. Front inner surface 30 may extend longitudinally in a direction substantially parallel to the longitudinal axis L. Front inner surface 30 may comprise a first stepped portion 36, a recessed portion 38 and a second stepped portion 40. First stepped portion 36, recessed portion 38 and second stepped portion 40 may be mutually parallel. First stepped portion 36, recessed portion 38 and second stepped portion 40 may have equal widths.

Figure 3:
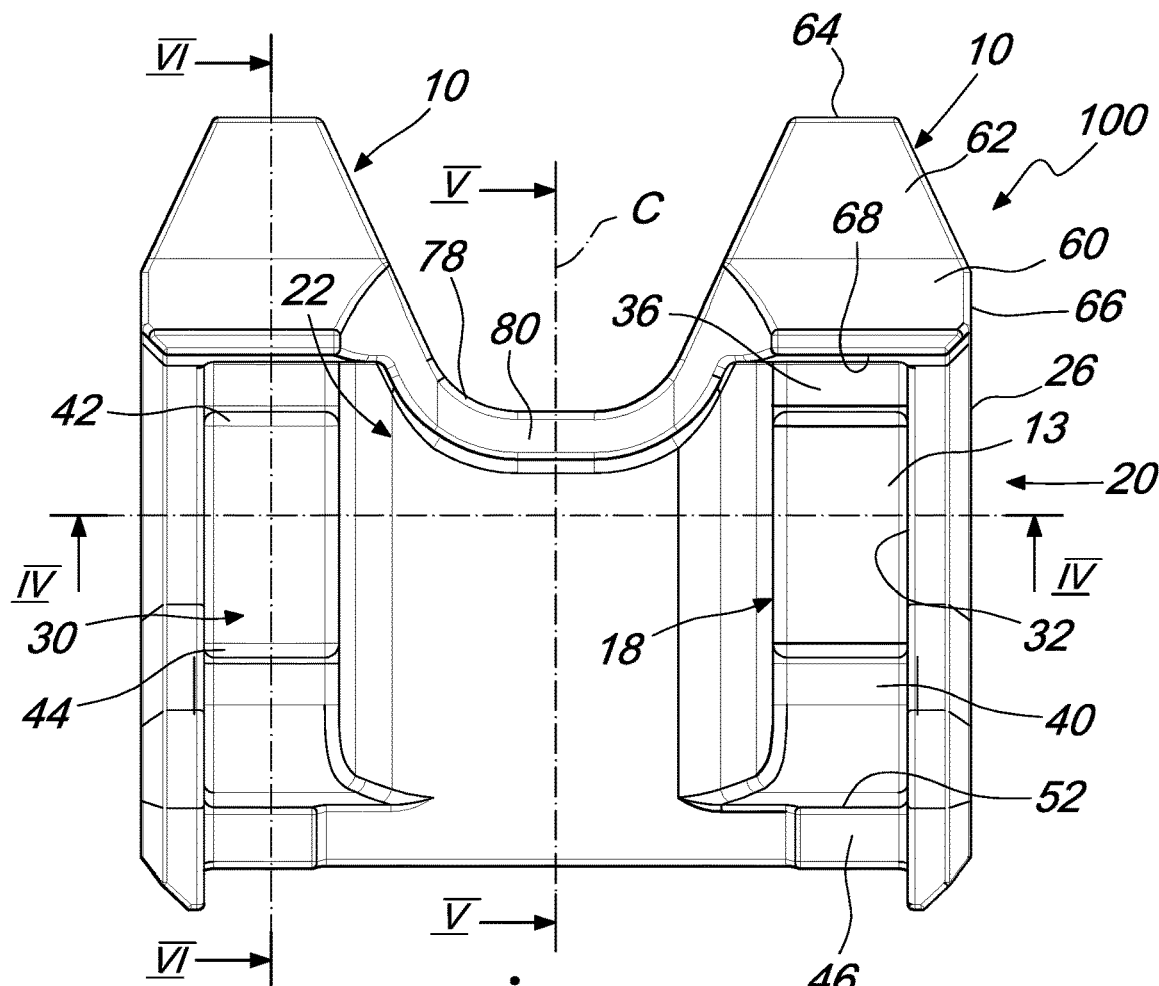
FIG. 3 is a rear plan view of a tooth block according to the present disclosure.

With reference to FIG. 3, first stepped portion 36 may be joined to the recessed portion 38 through a first slope 42. Second stepped portion 40 may be joined to the recessed portion 38 through a second slope 44. First and second slopes 42, 44 may be curved slopes. The recessed portion 38 may be recessed into front wall 18. Recessed portion 38 may be recessed away from the longitudinal axis L.

First stepped portion 36, recessed portion 38 and second stepped portion 40 may be ordered along the longitudinal axis L. Recessed portion 38 may be positioned between the first stepped portion 36 and the second stepped portion 40. First stepped portion 36 may be positioned adjacent the impact member 14. Second stepped portion 40 may be positioned remote from the impact member 14.

With reference to FIG. 2, end wall 20 may have an end inner surface 32. End inner surface 32 may contact the respective surface on the demolition tool. End inner surface 32 may be substantially planar. End inner surface 32 may extend longitudinally in a direction substantially parallel to the longitudinal axis L. End inner surface 32 may extend from the base edge 23 to the impact member 14. End inner surface 32 may be bound by the side edge 21. End inner surface 32 may be contiguous with the front inner surface 30 along the edge opposite the side edge 21. The end inner surface 32 may be inclined relative to the front inner surface 30. In an embodiment, the end inner surface 32 may be substantially orthogonal to the front inner surface 30.

With reference to FIG. 3, in an embodiment, sidewall 22 may have a side inner surface 34. Side inner surface 34 may extend longitudinally in a direction substantially parallel to the longitudinal axis L. Side inner surface 34 may be contiguous with the front inner surface 30 along an edge.

Figure 4:
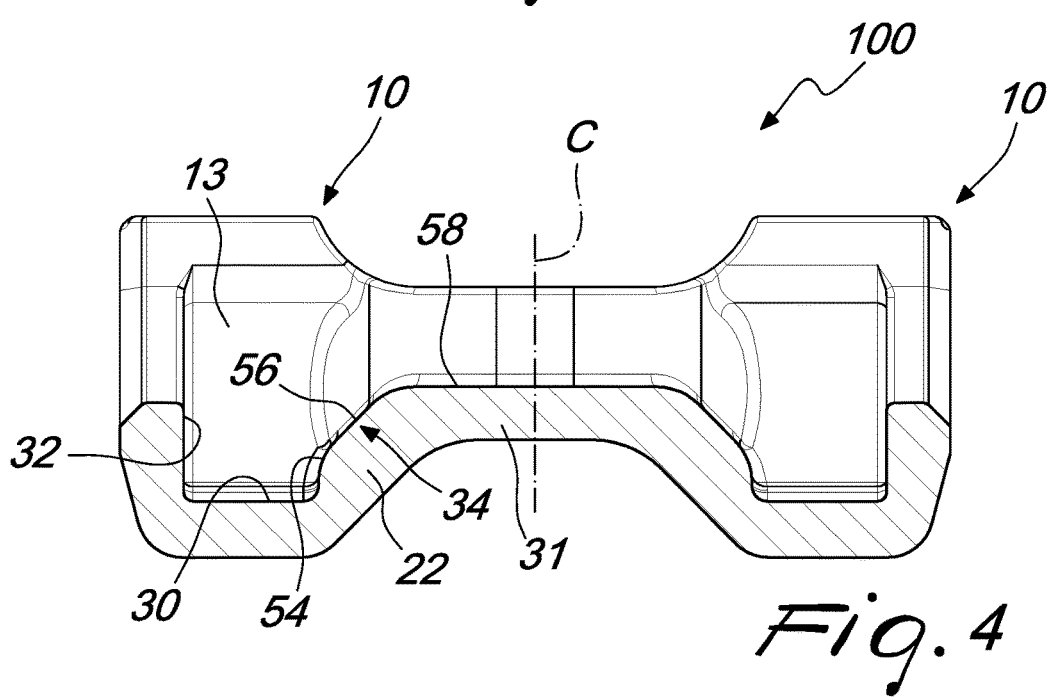
FIG. 4 is a view along a transverse section of the tooth block of FIG. 3.

With reference to FIG. 4, in a further embodiment, side inner surface 34 may comprise a first section 54 and a second section 56. First section 54 and second section 56 may each extend longitudinally in a direction parallel to the longitudinal axis L. First section 54 and second section 56 may be mutually parallel.

First section 54 may be curved. First section 54 may have a convex curvature. First section 54 may be adjacent to the front inner surface 30. First section 54 and second section 56 may be layered longitudinally relative to the front inner surface 30. First section 54 may be interposed between the front inner surface 30 and the second section 56. First section 54 may contact the respective surface on the demolition tool.

Second section 56 may be planar. Second section 56 may be spaced from the front inner surface 30. Second section 56 may be inclined relative to the front inner surface 30. Second section 56 may be inclined relative to the end inner surface 32.

With reference to FIG. 4, in yet a further embodiment, intermediate wall 31 may have an intermediate inner surface 58. Intermediate inner surface 58 may extend longitudinally in a direction parallel to the longitudinal axis L. Intermediate inner surface 58 may be contiguous with the second section 56. Intermediate inner surface 58 may be substantially parallel to front inner surface 30. Intermediate inner surface 58 may be substantially orthogonal to the end inner surface 32.

With reference to FIGS. 2 and 3, body 12 may further comprise a base member 46. Base member 46 may be substantially orthogonal to the longitudinal axis L. Base member 46 may be remote from the impact member 14. Base member 46 may be disposed on an end of the front wall 18 opposite the impact member 14.

With reference to FIG. 3, base member 46 may be disposed on the front inner surface 30. Base member 46 may extend from the second stepped portion 38. Base member 46 may extend in a direction substantially orthogonal to the longitudinal axis L. Base member 46 may be substantially planar. Base member 46 may be transversely positioned between the end wall 20 and the sidewall 22. Base member 46 may be joined to the end inner surface 32. Base member 46 may be joined to the side inner surface 34.

Base member 46 may have a base inner surface 52. Base inner surface 52 may be interposed between the end inner surface 32 and side inner surface 34. Base inner surface 52 may be contiguous with the end inner surface 32 on a side and with the side inner surface 34 on the opposite side. Base inner surface 52 may be contiguous with the front inner surface 30.

Body 12 may have a cavity 13. The cavity 13 may be enclosed by the front wall 18 and the end wall 20. Cavity 13 may be defined by the front inner surface 30 and the end inner surface 32. In an embodiment, the cavity 13 may be further enclosed by the sidewall 22. Cavity 13 may be defined by the side inner surface 34. In yet a further embodiment, cavity 13 may be further enclosed by the base member 46. Cavity 13 may be defined by base inner surface 52.

With reference to FIG. 3, impact member 14 may extend from the body 12. Impact member 14 may extend longitudinally from the body 12. Impact member 14 may extend from the body 12 along a direction parallel to the longitudinal axis L. Impact member 14 may be extended away from the cavity 13. Impact member 14 may be extended away from the base member 46.

Figure 5:
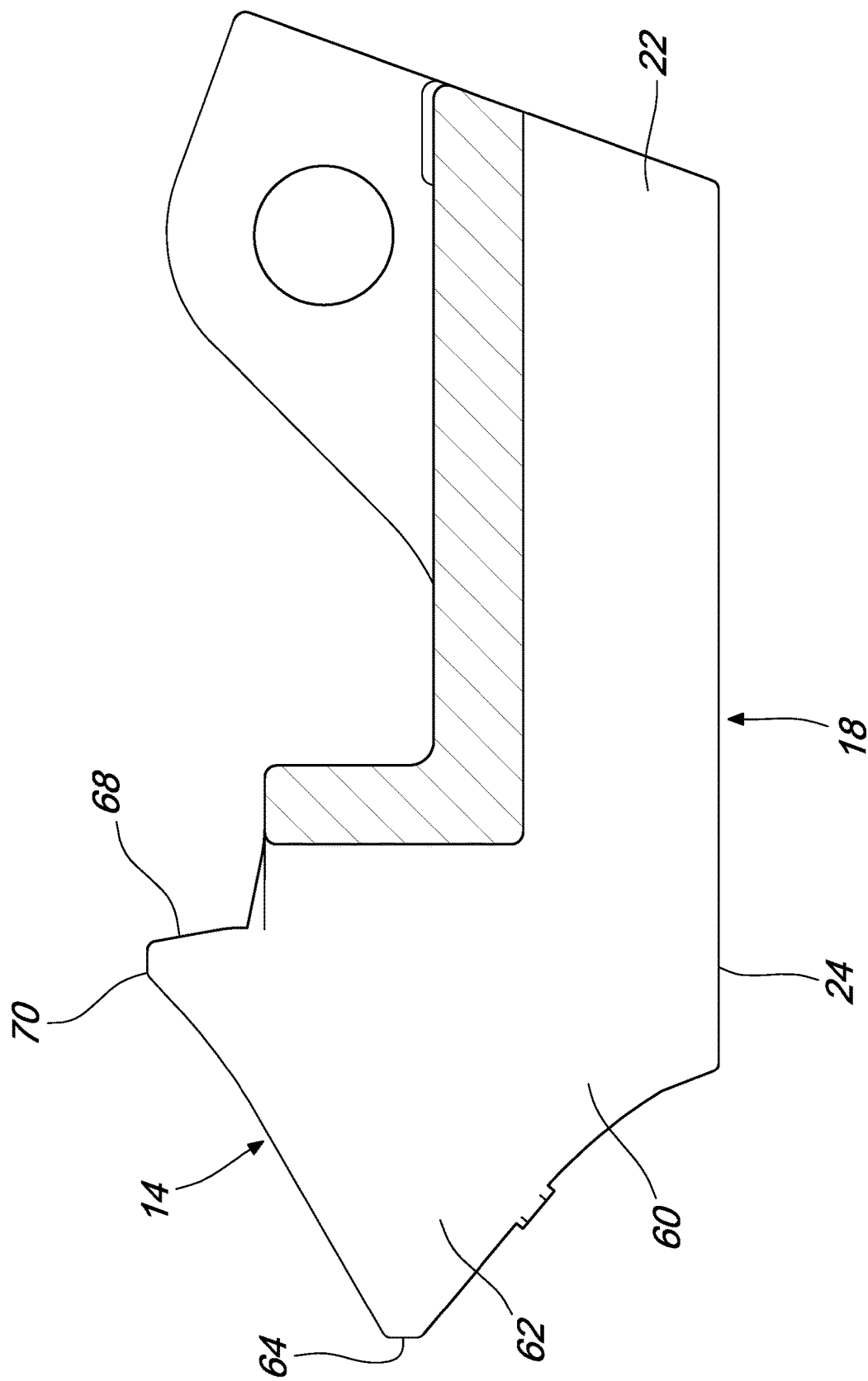
FIG. 5 is a view along a longitudinal section of the tooth block of FIG. 3.

Impact member 14 may have a base portion 60 and a tooth portion 62. Base portion 60 may be joined to the body 12. Base portion 60 may have four sides. Base portion 60 may be joined to the front wall 18 and the end wall 20. Base portion 60 may be supported on two adjacent edges by the front wall 18 and the end wall 20. The base portion 60 may be contiguous with the front wall 18 and the end wall 20. The outer surface 66 of base portion 60 may be planar with the end contact surface 26 of the end wall 20. With reference to FIG. 5, the corresponding outer surface of base portion 60 may be inclined relative to the front contact surface 24 of the front wall 18.

With reference to FIG. 3, in an embodiment, base portion 60 may be joined to the sidewall 22. Base portion 60 may be supported on a third edge by the sidewall 22. The surface of the base portion 60 may be contiguous with the front wall 18 and the end wall 20.

The tooth portion 62 may extend from the base portion 60. Tooth portion 62 may have four sides that join the corresponding sides of the base portion 60. Tooth portion 62 may have slanted sides that are inclined relative to the longitudinal axis L. A slanted side may be inclined relative to outer surface 66 of the base portion 60. The remaining slanted sides may be planar with the corresponding outer surfaces of the base portion 60. Tooth portion 62 may have a pyramidal shape.

In an embodiment, impact member 14 may extend on the sidewall 22. Sidewall cover 78 may be contiguous with the base portion 60. Sidewall cover 78 may extend internally over the sidewall 22. In a further embodiment, an intermediate wall cover 80 may be disposed on the intermediate wall 31. Intermediate wall cover 80 may be contiguous with the side cover 78. Intermediate wall cover 80 may extend internally over the intermediate wall 31.

FIG. 5 illustrates a side view of the tooth shroud 10 when viewed from the side of the sidewall 22. Base portion 60 may have a free base portion edge 68 adjacent the edges joined to the end wall 20 and the sidewall 22. Base portion edge 68 may be disposed over the cavity 13 (not shown). A ledge 70 may be connected to the base portion edge 68. Ledge 70 may be extended in a direction substantially orthogonal to the longitudinal axis L.

With reference to FIGS. 3 and 5, tooth portion 62 may have a truncated apex 64. Plane of the apex 64 may be orthogonal to the longitudinal axis L. Apex 64 may be oriented to be aligned with the front wall 18. The longitudinal axis of the apex 64 may be parallel to the transverse axis of the front wall 18. Apex 64 may be oriented to be aligned with the end wall 20. The transverse axis of the apex 64 may be parallel to the transverse axis of the front wall 18.

Figure 6:
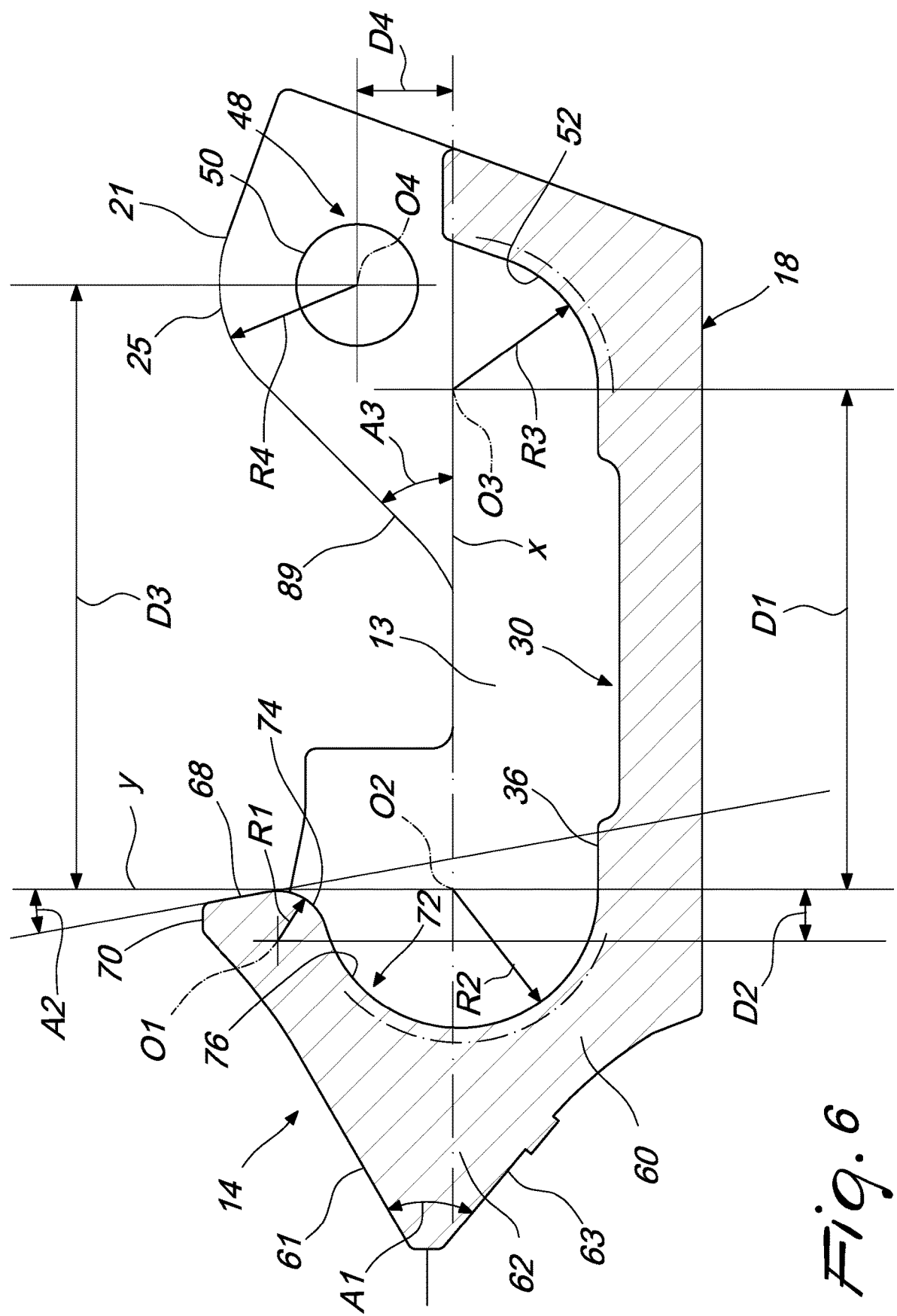
FIG. 6 is a view along a longitudinal section of a tooth shroud of the tooth block of FIG. 3.

With reference to FIG. 6, impact member 14 may be partially hollow. Cavity 13 may extend partially into the impact member 14. Base portion 60 may enclose the extension of the cavity 13. Base portion 60 may have a base inner surface 72. The base inner surface 72 may contact the respective surface on the demolition tool. Base inner surface 72 may be configured for mating to a portion of a jaw of the demolition tool.

Base inner surface 72 may extend across the width of the front inner surface 30. Base inner surface 72 may be interposed between the end wall 20 and the side wall 22. Base inner surface 72 may extend from the base portion edge 68 to the front inner surface 30. Base inner surface 72 may be contiguous with the first stepped portion 36.

Base inner surface 72 may comprise a first portion 74 and a second portion 76. The first portion 74 may be adjacent the second portion 76. The first portion 74 may be contiguous with second portion 76. The first portion 74 may precede the second portion 76 with reference to base portion edge 68.

The first portion 74 may have a convex cross section. In an embodiment, the first portion 74 may be a convex arc in cross section. In an alternative embodiment, first portion 74 may be a convex circular arc in cross section. The second portion 76 may have a concave cross section. In an embodiment, the second portion 76 may be a concave arc in cross section. In an alternative embodiment, second portion 76 may be a concave circular arc in cross section. In an embodiment, the arc length of the second portion 76 may be greater than the arc length of the first portion 74.

First portion 74 may have a radius R1 of 12 mm to 16 mm. First portion 74 may have a radius R1 of 14 mm. R1 may have an origin O1 that is centre of the first portion 74. Origin O1 may be positioned in the base portion 60 adjacent the base portion edge 68.

Second portion 76 may have a radius R2 of 35 mm to 45 mm. Second portion 76 may have a radius R2 of 40 mm. R2 may have an origin O2 that is centre of the second portion 74. Origin O2 may be positioned in the cavity 13 adjacent the inner surface 72. Origin O2 may be positioned between the base portion edge 68 and the first stepped portion 36.

Base inner surface 52 may have a concave cross section. In an embodiment, the base inner surface 52 may be a concave arc in cross section. In an alternative embodiment, base inner surface 52 may be a concave circular arc in cross section. Base inner surface 52 may have a radius R3 of 35 mm to 45 mm. Base inner surface 52 may have a radius R3 of 40 mm. R2 may have an origin O3 that is centre of the base inner surface 52. Origin O3 may be positioned in the cavity 13 adjacent the base inner surface 52. Origin O3 may be positioned between the coupling portion 48 and the second stepped portion 40.

An axis X may connect origin O2 and origin O3. Axis X may be parallel to the longitudinal axis L. Tooth portion 62 may have an angle A1 of 70 degrees between a first tooth side 61 that is joined to the ledge 70 and a second tooth side 63 joined to the front wall 18. Tooth portion 62 may have an angle A1 of 70 degrees about axis X. The angle between the first tooth side 61 and the axis X may be 30 degrees. The angle between the second tooth side 63 and the axis X may be 40 degrees.

An axis Y may be normal to the axis X and may pass through origin O2. Angle A2 may be formed between the base portion edge 68 and the axis Y. Angle A2 may range from 7.5 degrees to 20 degrees. Angle A2 may be 10 degrees.

Side edge 21 may have a transition surface 25. Transition surface 25 may be adjacent the coupling portion 48. Transition surface 25 may have a convex cross section. In an embodiment, transition surface 25 may be a convex arc in cross section. In an alternative embodiment, transition surface 25 may be a convex circular arc in cross section. Transition surface 25 may have a radius R4 of 35 mm to 45 mm. Transition surface 25 may have a radius R4 of 40 mm. R4 may have an origin O4 that is centre of the transition surface 25. Origin O4 may be positioned in the coupling portion 48. Origin O4 may be the centre of hole 50.

The distance D1 between origin O2 and origin O3 may be 140 mm to 150 mm. The distance D1 between origin O2 and origin O3 may be 145 mm. Distance D1 may be parallel to the longitudinal axis L. The distance D2 between origin O1 and origin O2 may be 12 mm to 18 mm. The distance D2 between origin O1 and origin O2 may be 15 mm. Distance D2 may be parallel to the longitudinal axis L. The distance D3 between origin O2 and origin O4 may be 170 mm to 180 mm. The distance D3 between origin O2 and origin O4 may be 175.5 mm. Distance D3 may be parallel to the longitudinal axis L. The distance D4 between origin axis X and origin O4 may be 25 mm to 35 mm. The distance D3 between origin axis X and origin O4 may be 30 mm. Distance D4 may be normal to the longitudinal axis L.

Figure 7:
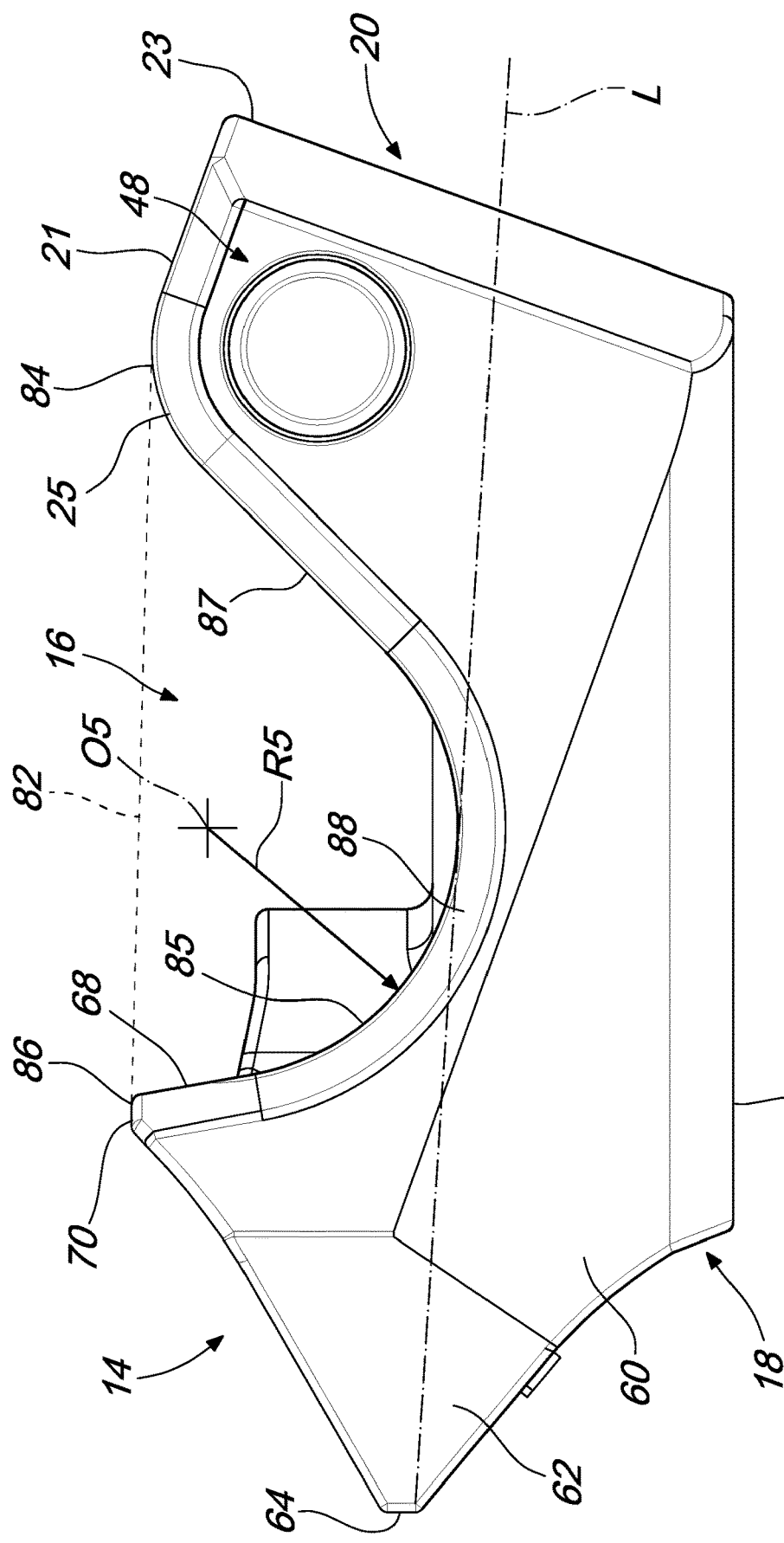
FIG. 7 is a side view of a tooth shroud showing a cut-out according to the present disclosure.

With reference to FIG. 7, cut-out 16 may be disposed on the end wall 20. Cut-out 16 may be formed in the end wall 20. Cut-out 16 may extend into the end wall 20 from the side edge 21. Cut-out 16 may lie on a plane parallel to the longitudinal axis L. In an embodiment, the plane may extend longitudinally through the cut-out 16. Cut-out 16 may extend to the facet 51. Plane of cut-out 16 may be inclined relative to the facet 51.

Cut-out 16 may be positioned opposite the apex 64. Cut-out 16 may be adjacent to the base portion 60. An end of the cut-out 16 may be adjacent the ledge 70 of the base portion 60. Cut-out 16 may be positioned axially aligned to the impact member 14. Base portion 60 may be interposed between the tooth portion 62 and the cut-out 16. Plane of cut-out 16 may be substantially orthogonal to the plane apex 64. The longitudinal axis of the apex 64 may be substantially orthogonal to the plane of the cut-out 16. Plane of cut-out 16 may be offset from the apex 64.

Cut-out 16 may be positioned between the impact member 14 and the coupling portion 48. Adjacent the impact member 14, the cut-out 16 may terminate at the junction of the ledge 70 and the end wall 20. Adjacent the coupling portion 48, the cut-out 16 may terminate at a point spaced from the base edge 23.

With reference to FIGS. 2 and 7, cut-out 16 may be limited on the side edge 21 by the terminal points 84, 86. Terminal point 84 may be positioned on the side edge 21 at the transition from a linear portion to the cut-out 16. Cut-out 16 may comprise the transition surface 25. Terminal point 84 may be positioned on the side edge 21 at the transition from a linear portion to the transition surface 25. Terminal point 84 may be spaced from the base edge 23. Terminal point 84 may be spaced from the corner of the side edge 21 and the base edge 23. Terminal point 86 may be positioned at the end of the side edge 21 adjacent to the impact member 14. Terminal point 86 may be adjacent the base portion edge 68 (not shown).

Cut-out 16 may have a cut-out opening 82 positioned between the impact member 14 and the coupling portion 48. Cut-out opening 82 may provide entry into the cut-out 16. Cut-out opening 82 may be delimited by terminal points 84, 86 on the side edge 21.

Cut-out 16 may comprise an arcuate curvature 85 disposed on the end wall 20. Cut-out 16 may be defined by an arcuate curvature 85 of the side edge 21. Arcuate curvature 85 of the cut-out 16 may be delimited at an end at the base portion edge 68. Arcuate curvature 85 of the cut-out 16 may be delimited at the terminal point 86 adjacent the base portion edge 68. The arcuate curvature 85 may be non-symmetrical. The arcuate curvature 85 may lean towards the impact member 14.

Arcuate curvature 85 may have a concave cross section. In an embodiment, arcuate curvature 85 may be a concave circular arc in cross section. Arcuate curvature 85 may have a radius R5 of 55 mm to 65 mm. Arcuate curvature 85 may have a radius R5 of 60 mm. R5 may have an origin O5 that is centre of the base inner surface 52. Origin O5 may be positioned in the cut-out 16. Origin O5 may be positioned between terminal points 84, 86.

The arcuate curvature 85 may have a cut-out apex 88. Cut-out apex 88 may be the point closest to the front contact surface 24. Cut-out apex 88 may be the point closest to the facet 51. Cut-out apex 88 may be disposed towards the impact member 14. The distance of the arcuate curvature 85 from terminal point 84 to the cut-out apex 88 may be greater than the distance of the arcuate curvature 85 from terminal point 84 to the cut-out apex 88.

In an embodiment, cut-out 16 may have a linear surface 89 between the arcuate curvature 85 and the transition surface 25. The arcuate curvature 25 may terminate at the linear surface 80. With reference to FIG. 6, the linear surface 89 may be inclined relative to axis X. Angle A3 may be formed between the linear surface 89 and the axis X. Angle A3 may range from 35 degrees to 55 degrees. Angle A3 may be 45 degrees.

With reference to FIG. 7, the front contact surface 24 of the front wall 18 may be substantially orthogonal to the plane of the cut-out 16. Front inner surface of the front wall 18 may be substantially orthogonal to the plane of the cut-out 16. In an embodiment, second section 56 of the side inner surface may be inclined relative to plane of the cut-out 16.

The cut-outs 16 of the first and second tooth shrouds 10 may be mutually aligned and have corresponding dimensions. The cut-outs 16 of the first and second tooth shrouds 10 may be positioned on opposite sides of the tooth block 100.

Figure 8:
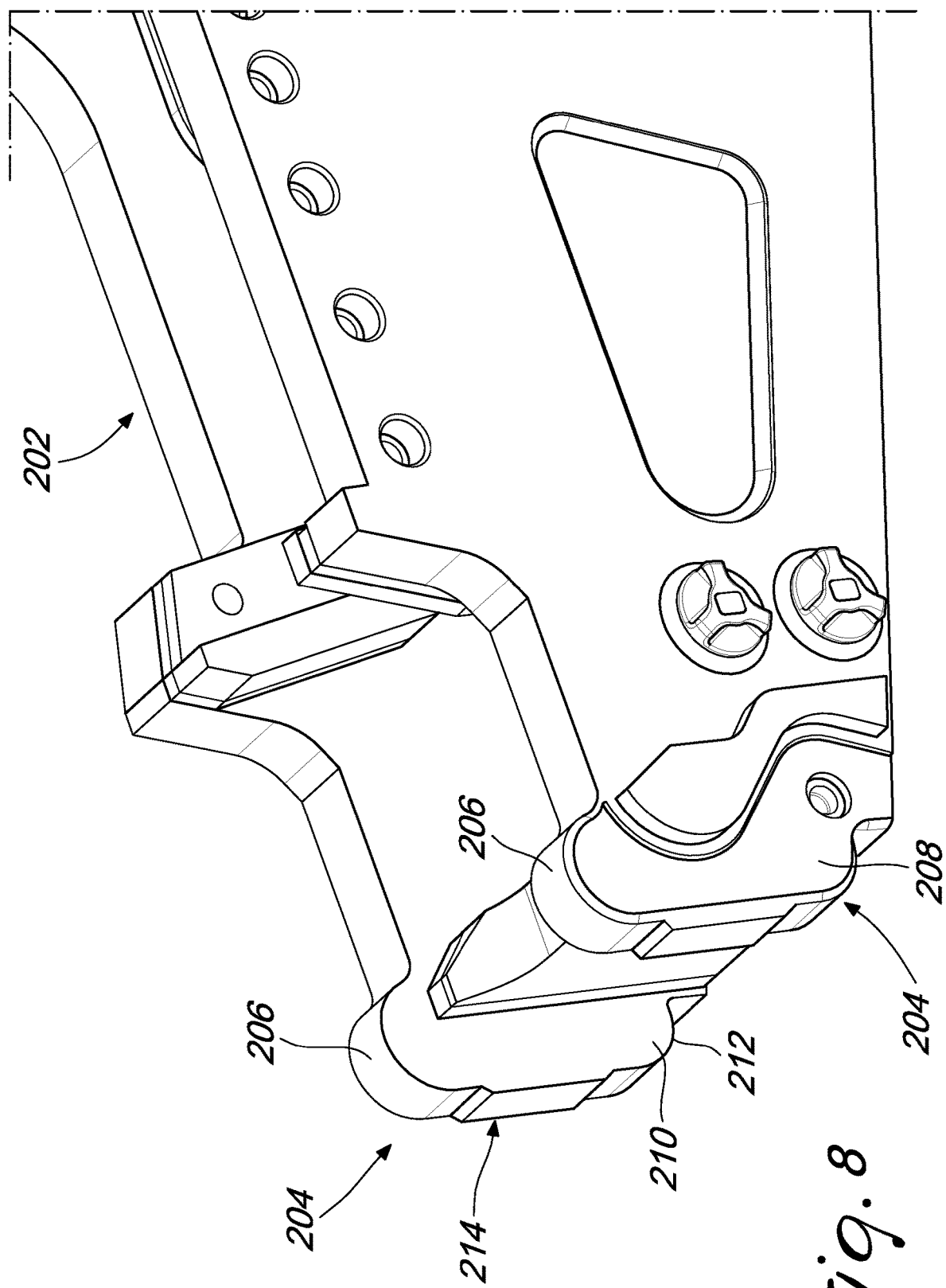
FIG. 8 is a perspective view of a jaw of a demolition tool.

FIG. 8 illustrates a jaw 202 of a demolition tool 200. In an embodiment, the jaw 202 may be a lower jaw. Jaw 202 may be configured to receive one or two tooth shrouds 10 or a tooth block 100. Jaw 202 may have projections 204 that are configured to be received in the cavity 13 of a tooth shroud 10.

Figure 9:
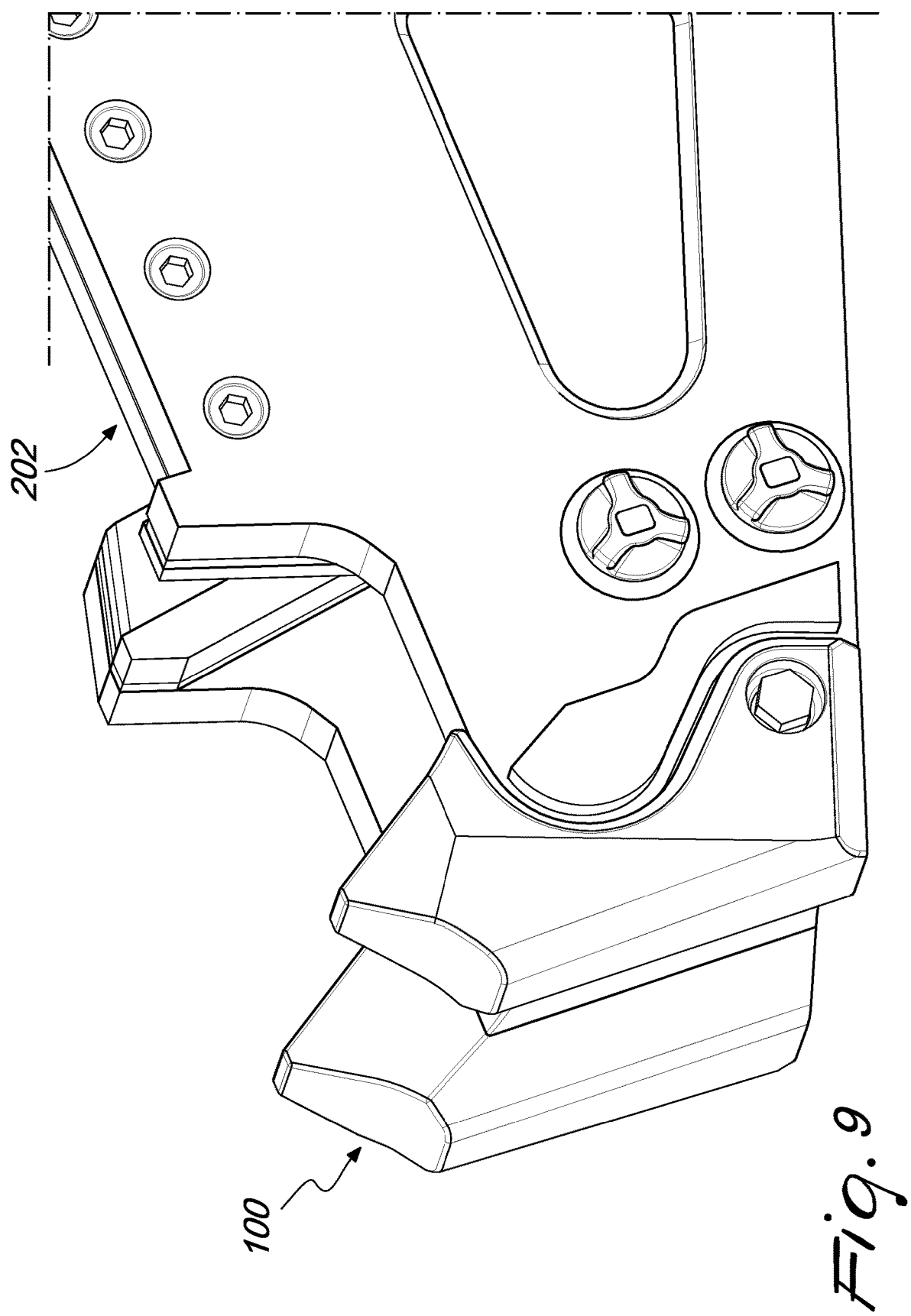
FIG. 9 is a perspective view of the jaw of FIG. 8 with a tooth block.
Figure 10:
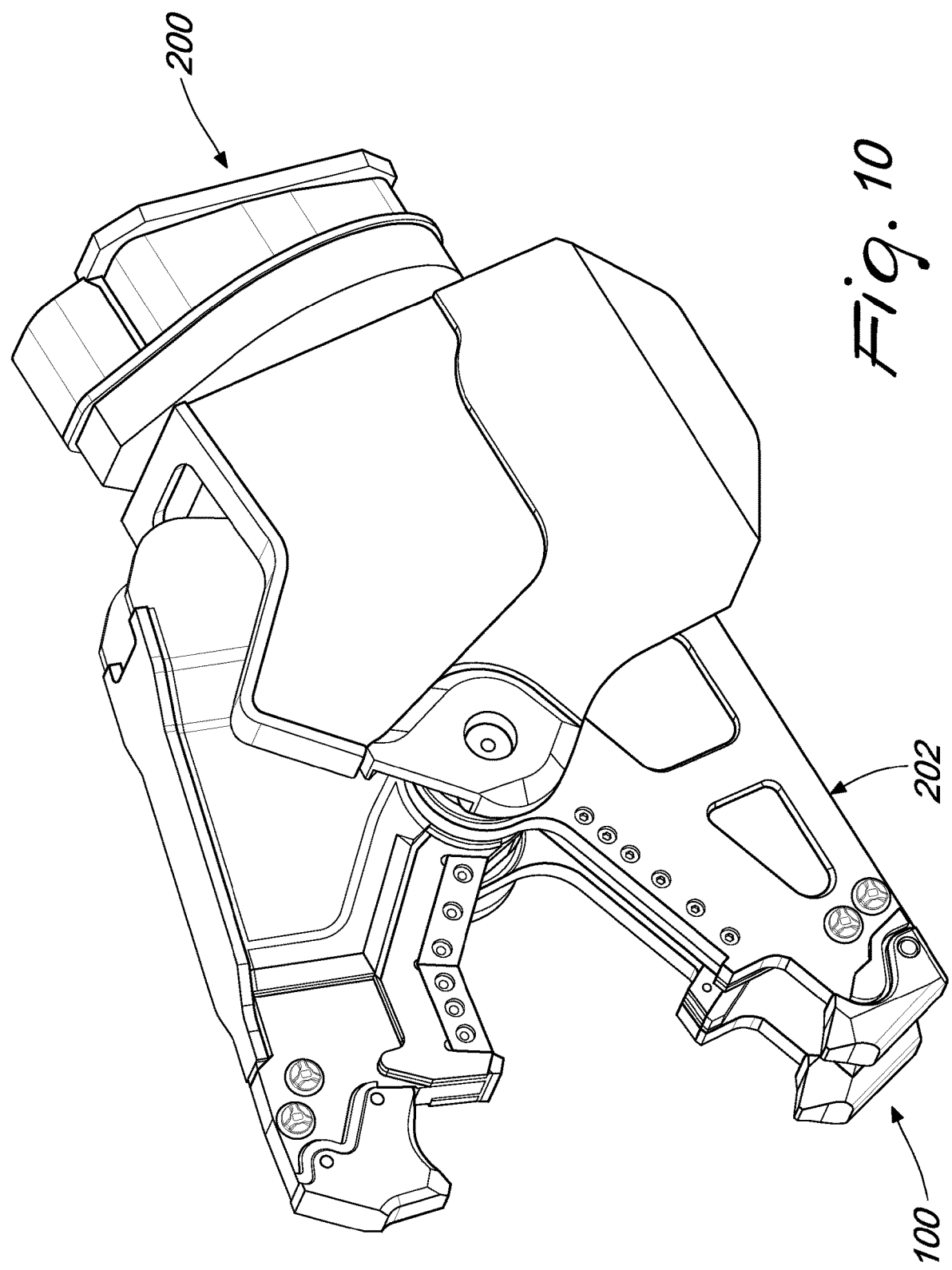
FIG. 10 is a perspective view of a demolition tool with a tooth block.

FIG. 9 illustrates a tooth block 100 mounted on the jaw 202. The tooth block 100 may be supported on the jaw 202 through the engagement of the projections 204 in the first and second tooth shrouds 10. The projections 204 may engage the respective inner surfaces 72, front inner surfaces 30 and the base inner surfaces 52. FIG. 10 illustrates a tooth block 100 mounted on the jaw 202 of the demolition tool 200.

With reference to FIG. 8, for mounting of the tooth block 100 projection 204 may have a half round 206 that contacts the second portion 76 of the inner surface 72 of a tooth shroud 10. A side 208 of the projection 204 may contact end inner surface 32. Projection base 212 may contact the base inner surface 52 of the base member 46. Abutment surface 214 may contact the front inner surface 30.

The skilled person would appreciate that foregoing embodiments may be modified or combined to obtain the tooth block 100 of the present disclosure.

INDUSTRIAL APPLICABILITY

This disclosure describes a tooth block 100. The tooth block 100 may each be removably mounted to a jaw of a demolition tool. The cut-out may permit forces produced during a demolition operation to be dissipated about the tooth block 100. The cut-out may permit the forces to be dissipated within the tooth block 100 so as to avoid excessive forces at stress points. The dissipated forces may be reduced at specific stress points in order to reduce failures or fractures. The stress points may be adjacent to the demolition tool. In an embodiment, the stress points may be located on the demolition tool.

During demolition operations, crushing forces and breakout forces may be produced. A crushing force may be applied by the movable jaw onto the respective impact members 14, on the fixed jaw, through the material being demolished. The crushing force may be directly related to the pressure in the cylinder. The direction of the crushing force may be defined by the axis through the tips of teeth, on the movable jaw, and the tooth portions 62 of the respective impact portions 14 at maximum jaw opening. The magnitude of the crushing force is the crushing force of the demolition tool. The crushing force may be at its maximum when the jaws of the demolition tool are fully opened and decreases to about 50% of this maximum during closing of the jaws. The magnitude of the crushing force is measured at maximum cylinder pressure.

The break out force may be normal to the crushing force. The break out force may be applied to the tooth block 100 by the movement of the cylinders during demolition operations. The magnitude of the breakout force can be calculated as the friction between the material and the tips of the tooth and the impact members 14 when the crushing forces acts on the tips. A breakout force may be produced when the tips hook into an object and the demolition tool is used as a lever to break or move the object.

Breakout forces may not be the primary force required for demolition operations and may instead have adverse stresses on the tooth shroud or the tooth block. The cut-outs 16 may enable the breakout forces to be dissipated. During a demolition operation the cut-outs 16 may enable the tooth block 100 to undergo a deformation so as to dissipate the breakout forces. A relatively greater portion of the forces may be dissipated through the front walls 18, in particular between the front contact surfaces 24 and the front inner surfaces 30. The tooth block 100 may undergo a resilient deformation. The impact members 14 may rotate relative to the respective coupling portions 48.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by reference signs, the reference signs have been included for the sole purpose of increasing the intelligibility of the claims and accordingly, neither the reference signs nor their absence have any limiting effect on the technical features as described above or on the scope of any claim elements.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

The disclosures in European Patent Application No. 15155108.2 from which this application claims priority are incorporated herein by reference.

The invention claimed is:

1. A tooth block for a demolition tool, the tooth block comprising:
   a first tooth shroud and a second tooth shroud, the first and second tooth shrouds each comprising:
   a body having a front wall and an end wall, wherein a cavity is enclosed by the front wall and the end wall;
   an impact member extending longitudinally from the body; and
   a cut-out disposed on the end wall, wherein:
      each end wall comprises a free side edge with a cut-out defined by an arcuate curvature of the side edge,
      the cut-out comprises a linear surface and the arcuate curvature terminates at the linear surface,
      wherein the linear surface is inclined relative to an axis with an angle ranging from 35 degrees to 55 degrees, the axis being disposed in the body between a center of a first portion formed as a convex arc in cross section and a center of a base inner surface formed as a convex arc in cross section, and
      wherein the first tooth shroud is connected to the second tooth shroud.

2. The tooth block of claim 1 wherein a central member connects the first and second tooth shrouds.

3. The tooth block of claim 2 wherein the first tooth shroud is specular to the second tooth shroud about a central axis disposed through the central member.

4. The tooth block of claim 1 wherein the cut-outs are mutually aligned and have corresponding dimensions.

5. The tooth block of claim 1, wherein the arcuate curvature is non-symmetrical and has a cut-out apex disposed towards the respective impact members.

6. The tooth block of claim 1, wherein the arcuate curvature has a radius of 55 mm to 65 mm.

7. The tooth block of claim 1 wherein the plane of each cut-out is parallel to the respective longitudinal axes of each body.

8. The tooth block of claim 1 wherein each front wall comprises a front contact surface orthogonal to the plane of the respective cut-outs.

9. The tooth block of claim 1 further comprising a coupling portion disposed on each end wall remote from the respective impact members and wherein each cut-out is disposed between the respective impact members and coupling portions.

10. The tooth block of claim 1 wherein each impact member has a truncated apex, the longitudinal axis of each apex being orthogonal to the plane of the respective cut-outs.

* * * * *